United States Patent [19]

Ishida et al.

[11] Patent Number: 4,567,630
[45] Date of Patent: Feb. 4, 1986

[54] PROCESS OF CONTINUOUSLY PRODUCING PLATE-SHAPED CATALYST AND SYSTEM THEREFOR

[75] Inventors: Nobuyoshi Ishida; Toshiharu Nagashima; Katsutaro Miyake, all of Kure, Japan

[73] Assignee: Babcock-Hitachi Kabushiki Kaisha, Tokyo, Japan

[21] Appl. No.: 356,754

[22] Filed: Mar. 10, 1982

[30] Foreign Application Priority Data

Mar. 10, 1981 [JP] Japan ................................. 56-33174

[51] Int. Cl.⁴ ..................... B21D 31/02; B21D 53/00; B23P 17/00
[52] U.S. Cl. .................................. 29/6.2; 29/157 R; 29/527.4; 72/181; 72/183; 72/205; 422/180; 427/209; 427/247; 427/422; 427/425; 427/427
[58] Field of Search ...................... 29/157 R, 6.1, 6.2, 29/527.2, 527.4; 252/477 R, 461, 465; 422/177, 180; 72/167, 176, 179, 181, 205, 248, 183; 427/209, 247, 422, 423, 425, 424, 427

[56] References Cited

U.S. PATENT DOCUMENTS

| 1,485,917 | 3/1924 | Harter | 72/176 |
|---|---|---|---|
| 1,946,240 | 2/1934 | Rohn | 72/205 X |
| 2,602,521 | 7/1952 | Smith | 29/6.2 X |
| 2,731,379 | 1/1956 | Wheeler | 29/6.2 X |
| 2,854,732 | 10/1958 | Hessenberg | 29/527.4 |
| 2,972,185 | 2/1961 | Brennan | 427/209 |
| 2,988,128 | 6/1961 | Pappelendam | 72/176 |
| 3,081,651 | 3/1963 | Roberts | 72/205 X |
| 3,165,815 | 1/1965 | Wögerbauer | 72/179 X |
| 3,274,679 | 9/1966 | Kennedy | 29/527.2 X |
| 3,310,870 | 3/1967 | Parikh et al. | 29/527.2 X |
| 3,433,037 | 3/1969 | Lemon | 72/248 X |
| 3,645,121 | 2/1972 | Pfeiffer et al. | 72/205 |
| 3,793,692 | 2/1974 | Tate et al. | 29/6.1 X |
| 3,839,888 | 10/1974 | Greenburger | 72/205 X |
| 3,884,729 | 5/1975 | Jackson et al. | 29/527.2 X |
| 3,969,480 | 7/1976 | Fedor et al. | 422/177 X |
| 4,006,105 | 2/1977 | Fedor et al. | 252/477 R X |
| 4,078,898 | 3/1978 | Fedor et al. | 422/177 |
| 4,096,095 | 6/1978 | Cairns | 252/465 |
| 4,111,849 | 9/1978 | Fedor | 252/477 R X |
| 4,119,701 | 10/1978 | Fedor et al. | 252/477 R X |
| 4,189,405 | 2/1980 | Knapton et al. | 252/462 |
| 4,195,509 | 4/1980 | Herburg | 72/167 |
| 4,289,652 | 9/1981 | Hunter et al. | 252/477 R X |
| 4,293,447 | 10/1981 | Inaba et al. | 252/477 R X |
| 4,293,449 | 10/1981 | Herrington et al. | 252/477 R X |
| 4,305,187 | 12/1981 | Iwamura et al. | 29/6.2 X |
| 4,363,680 | 12/1982 | Buck, Jr. et al. | 427/209 X |
| 4,382,976 | 5/1983 | Restall | 427/209 X |

Primary Examiner—Howard N. Goldberg
Assistant Examiner—Ronald S. Wallace
Attorney, Agent, or Firm—Beall Law Offices

[57] ABSTRACT

There is proposed a process of continuously producing a catalyst plate, wherein a thin metal plate is formed by use of a blade with slits in the widthwise directions thereof, expanded in the longitudinal direction thereof into an expanded metal plate having formed therein meshes, the expanded metal plate thus formed is corrected in shape, degreased, thereafter, molten metal such as molen aluminum is sprayed onto the expanded metal plate to form roughened surfaces on the opposite sides of the expanded metal plate, further, a catalytic substance is deposited onto the roughened surfaces, thereafter, formed into a predetermined form, and shorn into pieces. There is proposed a pinch roll system having a tension roll, in which end portions in the widthwise direction are vertically movable so as to be used as a corrector for the expanded metal plate, and a stepping press system to be used as a former for the expanded metal plate.

14 Claims, 12 Drawing Figures

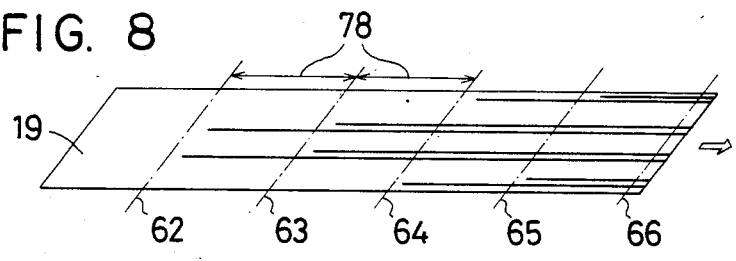
FIG. 8
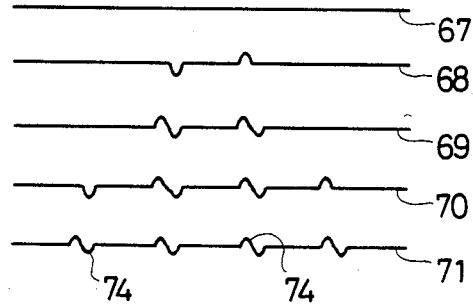
FIG. 9
FIG. 10
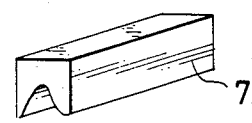
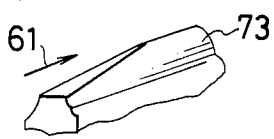
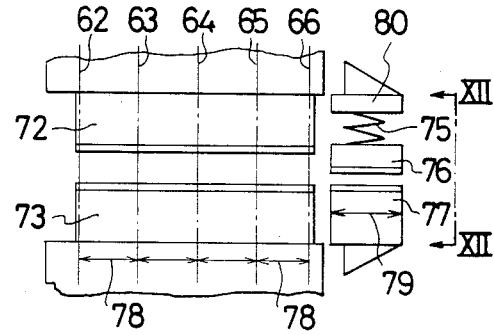
FIG. 11
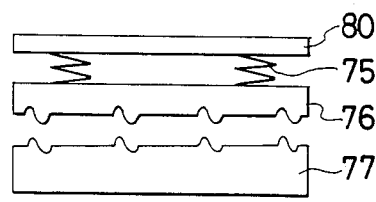
FIG. 12

PROCESS OF CONTINUOUSLY PRODUCING PLATE-SHAPED CATALYST AND SYSTEM THEREFOR

BACKGROUND OF THE INVENTION

1. Field of the Invention

The present invention relates to a process of producing a catalyst plate, and particularly to a process suitable for continuously mass-producing catalyst plates in each of which a catalytic substance is deposited on a substrate of an expanded metal plate, and a system for use in the process.

2. Description of the Prior Art

Heretofore, there has been known to use a catalyst plate for the denitration of exhaust gas in which a catalytic substance is applied to an expanded metal plate. The expanded metal plate of the type described is produced such that, as shown in FIG. 2, a thin metal plate 16 is formed therein with slits by means of a blade 90, and expanded to form therein meshes. In this case, however, there should necessarily occur differences in length due to differences between meshes in opening degree, with the result that tongue portions 16A are formed at the forward end portion of the expanded metal plate and further the expanded metal plate is curved. The differences between meshes in opening degree are attributed to errors in accurracy of working by use of a working machine and the blade 90, frictions at the sliding surfaces of the machine, the degree of sharpness of the blade 90, the variability in thickness of the material and the like. Consequently, as shown in FIG. 3, in general, the blade 90 is divided into two or more blade portions and cutting depth 'a' by the blade portions 90A, 90B and 90C is made adjustable. However, as described above, the causes for generating differences between meshes in opening degree are varied and composite, and moreover, the adjustment of the blade 90 is very difficult to do, thereby necessarily causing distortions to the expanded metal plate thus produced.

To remove the above-described distortions, there has been used a roll leveller in which the metal plate is clamped by three rotary rolls, with one of the rolls contacting the upper surface of the metal plate and the two others contacting the lower surface thereof, and allowed to be passed therethrough. Nevertheless, the above-described roll leveller has principally functioned to correct irregular curls in the metal plate and could correct few distortions in the metal plate due to the differences between meshes in opening degree. In particular, when the metal plate is not shorn into pieces of short length during production process but wound for use, developments of curves in the widthwise direction and tongue portions in the metal plate due to the accumulation of the distortions have been remarkable, whereby difficulties have been encountered in producing the product by use of the above-described roll leveller, thereby deteriorating the material quality of the product.

On the other hand, there has been known a method wherein the metal plate is shorn into pieces of short length or substrates, a catalytic substance is applied to the substrate thus produced, and formed into a catalyst having a predetermined form. However, according to this method, each of the substrates is handled separately, many aspects of the production process resort to manual operations, and a large number of man-hours is required for the handling of the substrates, whereby the variability in the products produced is wide, making it difficult to apply the method to the mass production.

SUMMARY OF THE INVENTION

The present invention has been developed to obviate the above-described disadvantages of the prior art, and one object of the present invention is to provide a process of continuously producing uniform catalyst plates, minimizing the stages of work of manual operations, and a system therefor.

Another object of the present invention is to provide a process wherein distortions of an expanded metal plate due to differences between meshes in opening degree can be continuously corrected to thereby obtain catalyst plates uniform in material quality, and a system therefor.

A further object of the present invention is to provide a process of pressing a catalyst plate into a predetermined form, and a system therefor.

Other objects of the present invention will be made clear by the following descriptions.

The present invention comprises the steps of:
 forming slits in the widthwise directions by use of a blade in a thin metal plate, expanding same in a direction perpendicular to the slits to form an expanded metal plate having formed therein meshes;
 correcting the expanded metal plate;
 degreasing the expanded metal plate;
 spraying molten metal onto the expanded metal plate to form roughened surfaces thereon;
 applying a catalytic substance onto the surfaces of the expanded metal plate, which have been sprayed with molten metal;
 forming the thin expanded metal plate, to which has been applied the catalytic substance, into a predetermined form; and
 shearing the thin expanded metal plate thus formed to pieces.

According to the present invention, the aforesaid spraying step is preferably arranged such that the expanded metal plate is stretched across a plurality of rotary rollers in such a manner that one portion thereof is superposed on another, and the molten metal is sprayed onto and through the portions thus superposed.

Furthermore, as the aforesaid forming step, it is preferable to adopt a stepping press step wherein, while being pitch-fed, a plate material is gradually pressed by means of an upper and a lower press dies, and further, it is more preferable that the feeding direction of the plate material is aligned with the directions of angular ridges formed on the plate material by a press, and the pressing work by the aforesaid press step is successively performed from the central portion to opposite sides of the plate material in the widthwise direction thereof.

The most preferable expanded metal corrector used in the present invention comprises: inlet pinch rolls and outlet pinch rolls arranged in the direction of conveying the expanded metal plate; and a tension roll disposed between the both pairs of pinch rolls in the widthwise direction of the expanded metal plate, the opposite end portions of the tension roll being vertically movable independently of each other, so that the tension roll can be brought into a tilted state.

BRIEF DESCRIPTION OF THE DRAWINGS

FIG. 8 is a schematic view of the catalyst plate in explanation of the stepping press forming step according to the present invention;

FIG. 9 is a sectional view in explanation of the order of forming the angular ridges in the stepping press forming step as shown in FIG. 8;

FIG. 10 is a fractionary view showing the top die and the bottom die for use in the aforesaid press forming;

FIG. 11 is a schematic view in explanation of the case where sizing dies are disposed in the rear of the stepping press forming step according to the present invention; and FIG. 12 is a view in the direction indicated by the arrows from line XII—XII in FIG. 11.

PREFERRED EMBODIMENTS OF THE PRESENT INVENTION

Figure 1:
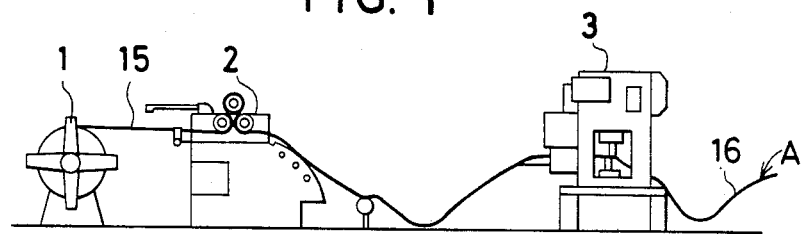
FIG. 1 is a schematic view showing the process of continuously producing a catalyst plate according to the present invention, and a system therefor.
Figure 1:
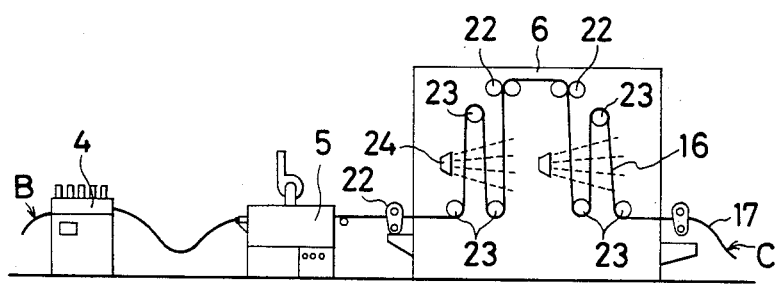
Figure 1:
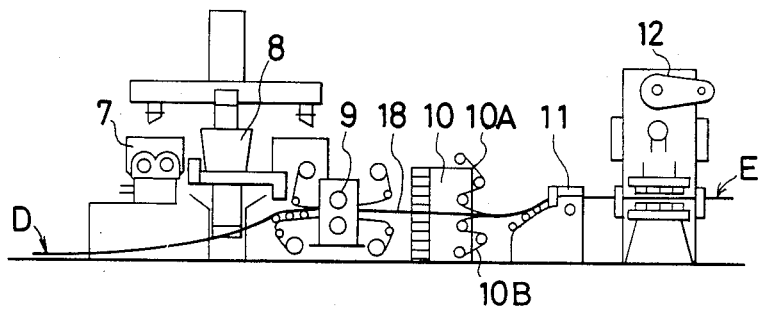
Figure 1:
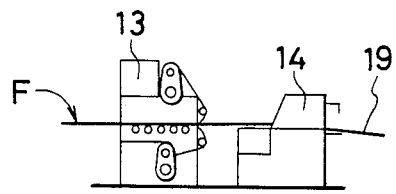
Figure 2:
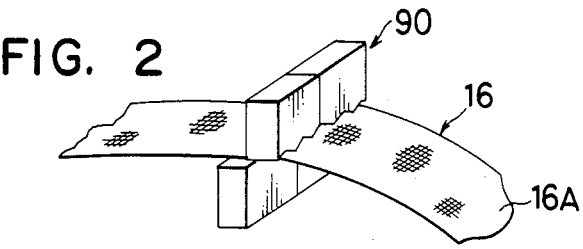
FIG. 2 is a partial schematic view showing the progress of working on the expanded metal plate in the expanded metal plate making machine.
Figure 3:
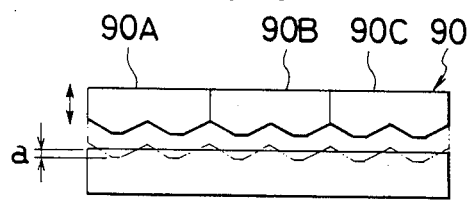
FIG. 3 is an elevational view showing the blade portions when a blade is divided in the expanded metal plate making machine.

The process of producing the catalyst plate or a system shown in FIG. 1 principally comprises: a leveller 2 for correcting the irregular curls of a thin metal plate found in the original material; an expanded metal plate making machine 3; an expanded metal plate corrector 4; a degreasing furnace 5; a sprayer 6 for spraying a coating metal (such for example as aluminium and stainless steel); a catalytic substance regulator 7; a uniform quantity feeder 8; applying pressure rolls 9; a sheet feeder 10; a former 12; a sheet winder 13; and a shearer 14. In addition, portions A, B, C, D, E and F of the expanded metal plate 16 as shown in the drawing are connected to one another. A thin metal plate 15 fastened to mandrel reel 1 has removed therefrom the irregular curls by the leveller 2, is formed into an expanded metal plate 16 by the expanded metal plate making machine 3, further, corrected by the expanded metal plate corrector 4, degreased by the degreasing furnace 5, sprayed thereonto with metal such as aluminium by the sprayer 6, thus producing a metal-coated expanded metal plate 17. This expanded metal plate 17 receives a supply of catalytic substance from the uniform quantity feeder 8 which catalytic substance is applied and bonded to the expanded metal plate 17 by the pressure rolls 9, is formed into a flat catalyst plate 18, is transferred by a roll feeder 11 to the former 12, where the expanded metal plate 17 is formed into a predetermined form, and thereafter, is shorn into pieces of predetermined lengths, whereby formed catalyst plates 19 are continuously produced. Here, the sheet feeder 10 and the sheet winder 13 are adapted to protect the expanded metal plate by clamping the catalyst plate between two sheets (an upper paper sheet 10A and a lower plastics sheet 10B) and to obtain clean contact surfaces. The catalytic substance regulator 7 is a device for compounding and kneading the catalytic substance to be applied to the thin metal plate. In the drawing, even if the expanded metal plate 16 is temporarily wound at a position A or C and the expanded metal plate 16 thus wound is fed at a position B or D, the same mass production effect is obtainable.

As shown in FIG. 1, the sprayer 6 according to the present invention comprises: a pinch roll group 22; a roll group 23 and a spray gun 24, whereby the expanded metal plate 16 is passed and moved through these groups of rolls, while being sprayed with molten metal such as aluminium by the spraying gun 24. Since the perforated expanded metal plate 16 is superposed three times in such a manner one portion thereof is superposed on another, in the direction of spraying (as indicated by a broken line), a sprayed material, which has been passed through a first plate, is caught by a second plate, and further, the sprayed material, which has been passed through the second plate, is caught by a third plate, thereby enabling to improve the yield of the sprayed material. In contrast thereto, when the molten metal is sprayed onto only one expanded metal plate, the sprayed metal is scattered through the meshes in the expanded metal plate, and oxidized in the air to be expanded in its volume, whereby a dust collector of a large capacity is required.

The above-described molten metal spraying forms roughened surfaces of a metallic oxide on the surfaces of the expanded metal plate, the roughened surfaces increase the catalyst retainability and also improve the resistance to acids.

It is preferable to adhere the catalyst onto the expanded metal plate so that the catalytic substance on one side of the plate can be connected with that on the other side thereof. In such a manner the catalyst layers on the both sides of the plate are anchored through the meshes of the plate to make it possible to further enhance the tight adhesion of the catalyst. This effectiveness is further promoted by mixing a filler in the catalyst.

When the catalyst plate is used for the denitration of the exhaust gas, the catalytic substances include titanium, vanadium, molybdenum, tungsten, tin, chromium, magnesium, iron and the like, for example.

Figure 4:
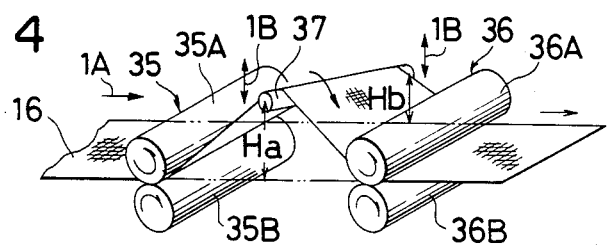
FIG. 4 is a schematic view in explanation of the principles of the expanded metal plate corrector according to the present invention.

FIG. 4 shows the basic construction of the expanded metal plate corrector 4 according to the present invention. As shown in this drawing, inlet pinch rolls 35 comprising an upper roll 35A and a lower roll 35B are disposed in the widthwise direction of the expanded metal plate 16 at the upstream of the expanded metal plate 16 in the flowing direction thereof (as indicated by an arrow 1A). In these inlet pinch rolls 35, the expanded metal plate 16 is conveyable, while being clamped by the upper and lower rolls 35A and 35B. On the other hand, outlet pinch rolls 36 similarly comprising an upper roll 36A and a lower roll 36B are disposed at the downstream of the expanded metal plate 16 in the flowing direction therof. When the diameter of these inlet pinch roll 35 is $\phi a$ and the number of rotation Na, and diameter of these outlet rolls 36 is $\phi b$ and the number of rotation is Nb, the relationship between the both pinch rolls 35 and 36 may be represented by the following formula:

$$\pi \times \phi a \times Na < \pi \times \phi b \times Nb$$

Because of this, a tension is applied to the expanded metal plate 16 being passed through the both pinch rolls 35 and 36 and meshes in the metal plate are expanded.

A tension roll 37 is disposed between the inlet pinch rolls 35 and the outlet pinch rolls 36 beneath the undersurface of the expanded metal plate 16 in the widthwise direction thereof perpendicularly intersecting the direction of conveying the expended metal plate 16 (as indicated by the arrow 1A). This tension roll 37 is constructed such that the opposite end portions thereof are vertically movable independently of each other (in a direction indicated by an arrow 1B), whereby the opposite end portions are made varied in their heights Ha and Hb from the surface of conveying the expanded metal plate 16, so that the tension roll 37 can be tilted with respect to the surface of conveying the expanded metal plate 16. When this tension roll 37 is tilted with respect to the surface of conveying the expanded metal plate 16, and further, the numbers of rotations Na and Nb are varied, lengths of side edges at the opposite ends of the expanded metal plate 16 between the pinch rolls 35 and 36 are varied, so that the rates of elongation of the meshes and the speeds of correction in the widthwise direction can be varied.

Depending upon the state of distortion before the correction, there are cases where the expanded metal plate cannot be corrected only by the above-described basic construction. In these cases, the number of times of correction should be increased by adopting a multi-stage roll construction.

Figure 5:
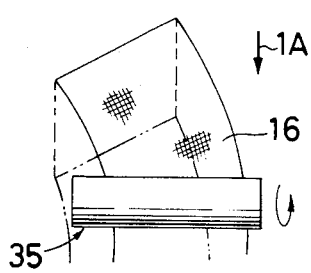
FIG. 5 is a plan view in explanation of the detracking movement of the expanded metal plate.
Figure 6:
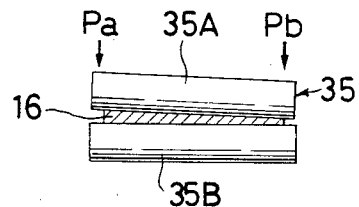
FIG. 6 is an elevational view in explanation of the moving direction of the expanded metal plate.

As shown in FIG. 5, in the corrector having the above-described construction, the expanded metal plate 16 may make the mistracking movement at the inlet pinch rolls 35 and may move to the ends of the rolls (as indicated by chain lines) to cite an extreme case. To remedy it, as shown in FIG. 6, utilizing the fact that, if the rolling pressures Pa and Pb at the opposite ends of the pinch rolls 35 are set at Pa>Pb, the expanded metal plate 16 should necessarily move to the side of Pb, the opposite ends of the upper roll 35A of the pinch rolls 35 are made vertically movable. For this, the rolling pressures at the opposite ends of the pinch rolls 35 are made variable, whereby the rolling pressures are variable corresponding to the mistracking movement.

Figure 7:
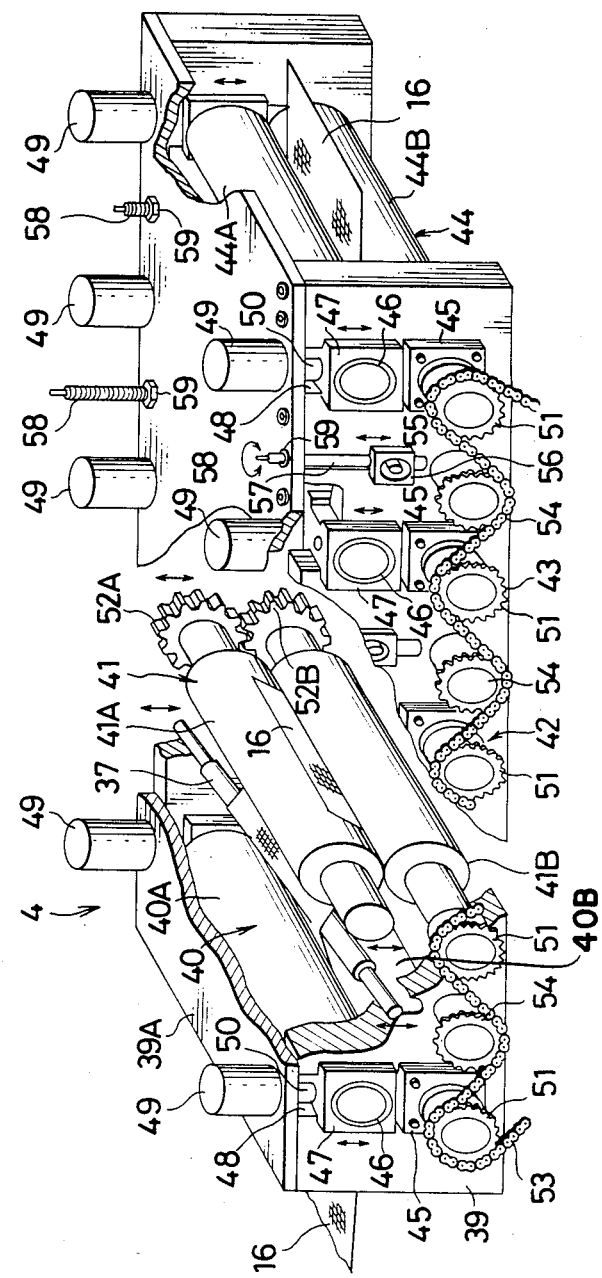
FIG. 7 is a partially cut-away view showing the basic construction of the expanded metal plate corrector according to the present invention.

FIG. 7 shows the expanded metal plate corrector 4 to which is actually applied the above-described basic construction. The corrector 4 shown in the drawing has a multi-stage roll construction. More specifically, in a corrector frame 39, there are positioned five pairs of pinch rolls 40, 41, 42, 43 and 44 from the upstream side in the direction of conveying the expanded metal plate, and four tension rolls 47 are interposed between the aforesaid pairs of pinch rolls 40 through 44. Since all of these pairs of pinch rolls 40 through 44 are of the arrangement identical with one another, only the first pair of pinch rolls 40 positioned at the most upstream side will be explained. Namely, the first pair of pinch rolls 40 comprises an upper roll 40A and the lower roll 40B, which is rotatably supported by a bearing 45 affixed to the frame 39. The upper roll 40A is similarly supported by the frame 39, and opposite ends of this upper roll 40A are made rotatable relative to guide posts 47 through needle bearings 46. These guide posts 47 are supported on the frame 39 by being fastened to grooves 48 formed in the frame 39. These grooves 48 are vertically upwardly formed in the frame 39 and the guide posts 47 are made movable along the grooves 48. Secured to these guide posts 47 are shafts 50 of air cylinders 49 provided on a top plate 39A of the frame 39. In consequence, the air cylinders 49 can be driven to adjust a separating distance between the upper and lower rolls 40A and 40B, and, when the air cylinders at the opposite ends are operated independently of each other, the rolling pressures at the opposite ends of the first pair of pinch rolls 40 can be varied. One end portion of the lower roll 40B of the first pair of pinch rolls is further projected from the bearing 45 and a chain sprocket 51 is secured to the end portion thus projected. Additionally, the upper rolls 40A through 44A and the lower rolls 40B through 44B in the respective pairs of pinch rolls 40 through 44 are meshed with each other at the ends thereof through gear wheels 52A and 52B, respectively. Since the arrangement of the first pair of pinch rolls 40 is identical with those of other pairs of pinch rolls 41 through 44, detailed explanation will be omitted with the same or similar parts being designated by the same reference numerals.

As aforesaid, the sprockets 51 are provided on the respective lower rolls 40B, 41B, 42B, 43B and 44B of the respective pinch rolls 40 through 44, and a chain 53 driven by a motor, is wound on the respective sprockets 51. In consequence, the respective pairs of pinch rolls 40 through 44 are driven at the numbers of rotations identical with one another by the driving force supplied. Because of this, in order to give a tension to the expanded metal plate 16 between the respective pairs of pinch rolls 40 through 44, the pairs of pinch rolls 40 through 44 are arranged such that the diameters of the pinch rolls are gradually increased from the first pair of pinch rolls 40 disposed at the most upstream side to the fifth pair of pinch rolls 44 disposed at the most downstream side, so that the circumferential speeds of the pinch rolls can increase toward the most downstream side. In addition, intermediate sprockets 54 are interposed between the respective chain sprockets 51 secured to the respective pinch rolls 40 through 44 at the same heights as those of the chain sprockets 51. These intermediate sprockets 54 are adapted to increase the angles of contact of the chain 53 for contacting the sprockets 51 provided on the respective pinch rolls.

Disposed at the respective intermediate positions of the pairs of pinch rolls 40 through 44 thus arranged are tension rolls 37 for suitably correcting the elongation value of the expanded metal plate 16. The opposite end portions of each of these tension rolls 37 are rotatably supported on slide posts 56 through spherical bearings 55, and these slide posts 56 are slidably coupled to grooves 57 formed in parallel to the aforesaid grooves 48 on the side walls of the frame 39. Each of the slide posts 56 is secured thereto with a vertically adjusting bolt 58 vertically upwardly extending, and this bolt 58 penetrates through the top plate 39A and projects therefrom. The vertically adjusting bolt 58 projecting from the top plate 39A is threadably coupled thereto with a nut 59, and rotation of this nut 59 makes it possible to adjust the heights of the opposite end portions of the tension roll 37 above the surface of conveying the expanded metal plate 16 at each of the pairs of pinch rolls 40 through 44 can be adjusted independently of each other.

With the expanded metal plate corrector 4 in the above-described embodiment, when the expanded metal plate 16 is passed therethrough, a tension is given to the expanded metal plate 16 between the respective pairs of the pinch rolls 40 through 44 and elongated, because the pairs of pinch rolls 40 through 44 are different in circumferential speed and the circumferential speeds of the pinch rolls increase toward the most downstream side. When there is a difference between meshes in opening degree in the widthwise direction of the expanded metal plate 16 under the above-described conditions, any of the tension rolls 37 may be tilted. More specifically, the tension roll 37 is tilted by means of the adjusting bolt 58 such that the height of the end portion of the tension roll 37, where the meshes in opening degree are larger, is decreased, while the height of the end portion, where the meshes in opening degree are smaller, is increased. With this arrangement, a difference in tension rendered in the widthwise direction is generated, so that the meshes of the expaned metal plate 16 to be conveyed can be made uniform.

Particularly, in this embodiment, the upper rolls 40A, 41A, 42A, 43A and 44A in the respective pairs of pinch rolls 40 through 44 are vertically moved, so that the rolling pressures at the opposite end portions can be adjusted, thereby enabling to prevent the mistracking movement of the expanded metal plate 16. As the result of operation by use of the above-described corrector 4, in working on a material (stainless steel type 304) having a substrate thickness of 0.3 mm and a substrate width of 500 mm, the maximum difference in length of 30 mm for the length of 800 mm of the material before the correction was corrected to be less than 3 mm.

As has been described hereinabove, with the above-described expanded metal plate corrector, the meshes of the metal plate in opening degree can continuously be made uniform and a straight expanded metal plate free from a distortion and a curve is obtainable.

Description will hereunder be given of a process wherein a catalyst plate 19, which has been produced by the production process shown in FIG. 1, is formed into a predetermined form by use of a stepping press.

According to the stepping press method, a plate material is step-by-step fed at a constant pitch, while being pressed step by step. Pitch is understood to mean the distance the plate material is moved forward in a single step of step-by-step feed in a stepping press. FIGS. 8 and 9 show the progress of working on the catalyst plate 19 according to the stepping press method. FIG. 8 is a perspective view of the plate material 19 travelling in an arrow-indicated direction. FIG. 9 shows sections 67, 68, 69, 70 and 71 taken on a forming die inlet portion 62, a first forming portion 63, a second forming portion 64, a third forming portion 65 and a forth forming portion 66 as shown in FIG. 8, respectively.

In the press device according to the present invention, the stepping (travelling) direction of the plate material is aligned with the direction of the angular ridges of the press dies, and the press forming is performed from the central portion to the opposite end portions in the widthwise direction of the plate material. Additionally, as shown in FIG. 10, in the forming die, a top die 72 and a bottom die 73 are progressively varied in configuration from the plate material inlet portion to the plate material outlet portion as indicated by an arrow 61.

Referring to FIGS. 8 and 9, the plate material is formed into a first form 68 as it travels from the forming die inlet portion 62 to the first forming portion 63, successively, formed into the second form 69, the third form 70, and formed into the fourth form 71 at the fourth forming portion 66 with the vertically symmetrical annular ridges 74 being formed at pitches equivalent to each other. Additionally, designated at 67 is a form of the plate material before the forming.

In the above-described embodiment, the alignment of the flowing direction of the plate material with the directions of the angular ridges makes the feed rate of the plate material constant, thereby enabling to effect the forming with high accuracies in dimensions. Furthermore, since the press step is divided into a plurality of parts and the press forming by the aforesaid press step is successively performed from the central portion to the opposite end portions in the widthwise direction of the plate material, shrinkage of the plate material due to the press forming can be relieved. Further, the press dies being progressively varied in configuration (tapered) from the plate material inlet portion to the plate material outlet portion is adopted, so that distortions, damages and the like caused to the plate material during press forming can be avoided.

With the above-described press dies, there are such cases that when the plate material 19 has travelled excessively forward, the plate material 19 jumps over the dies and the products thus formed become nonuniform. Furthermore, since the feed pitch for the plate material 19 cannot be made larger than the maximum feed pitch 78, there is a limit to the improvements in the productivity of the products. To obviate the above-described disadvantages, it is preferable to set sizing dies having a length larger in value than the maximum feed pitch at the latter stage of the press dies, in order to correct imperfect forms due to irregular feed pitches and increase the feed pitches in value.

FIG. 11 is a block diagram of a typical embodiment of the press forming device in which the above-descrived sizing dies are provided at the latter stage of the press dies. FIG. 12 is a front view in the direction indicated by the arrows from line XII—XII in FIG. 11. Referring to the drawing, a top sizing die 76 and a bottom sizing die 77, both of which are larger in value than the maximum feed pitch 78 of the forming device at the former stage, are provided at the latter stage (the outlet side) of the press forming device comprising a top die 72 and a bottom die 73, and the top sizing die 76 is supported by a die plate 80 through a spring 75. The sizing by use of the dies 76 and 77 is performed in a manner similar to the ordinary press forming.

When the length 79 of the sizing dies is made larger in value than the maximum feed pitch 78 as described above, the feed pitch becomes larger than the maximum feed pitch 78 and the angular ridges 74 (Refer to FIG. 9) become nonuniform. Even in this case, satisfactory sizing can be effected by use of the sizing dies 76 and 77.

As has been described hereinabove, the provision of the sizing dies at the final stage of the stepping press forming device makes it possible to press-form the plate material into a perfect form even when the feed pitches are not uniform, and the feed pitches can be increased in value, thereby improving the productivity in the press forming.

A multiplicity of catalyst plates produced according to the present invention are arranged in parallel to the flow of gas in a vessel for example, so as to form a catalytic reactor effectively utilized for the denitration of the exhaust gas, for example.

What is claimed is:

1. A process of continuously producing catalyst plates comprising the steps of:

forming slits in a continuous thin metal strip by use of a blade, said slits being perpendicular to the feed of the strip;

expanding the strip in a direction perpendicular to the slits to form an expanded metal strip having formed therein meshes;

correcting distortions in said expanded metal strip;

degreasing said expanded metal strip;

spraying molten metal onto said expanded metal strip to form roughened surfaces thereon;

applying a catalytic substance onto the roughened surfaces of said expanded metal strip;

clamping the strip resulting from the catalyst applying step between upper and lower continuous sheets to protect the roughened surfaces and to provide clean contact surfaces;

applying pressure to the strip resulting from the catalyst applying step by applying pressure to the clean contact surfaces in order to bond the catalytic substance to the roughened surfaces and to flatten it;

forming by pressing the thin expanded metal strip, to which the catalyst substance has been bonded, into a predetermind form;

removing the upper and lower sheets; and shearing the continuous thin expanded metal strip thus formed into plate pieces.

2. A process of continuously producing catalyst plates as set forth in claim 1, wherein a levelling step for correcting irregular curls of the thin strip is provided before the expanded metal strip making step.

3. A process of continuously producing catalyst plates as set forth in claim 1, wherein said spraying step includes passing the expanded metal strip around a plurality of rotary rollers in such a manner that portions of the expanded metal strip are superposed on each other so that one surface of the strip is facing itself and the opposite surface is facing itself, and further wherein the molten metal is sprayed in a direction onto one surface portion, that part of the sprayed metal passing through the meshes falling onto and passing through the opposite surface portion and, in the same fashion, any remaining succeeding superposed portions.

4. A process of continuously producing catalyst plates as set forth in claim 1, wherein said molten metal spraying step forms a metallic oxide.

5. A process of continuously producing catalyst plates as set forth in claim 1, wherein said correcting the expanded metal strip is carried out by using an expanded metal strip corrector comprising: inlet pinch rolls and outlet pinch rolls, each roll having an axis of rotation substantially perpendicular to the direction of flow of the expanded metal strip; and a tension roll disposed between each pair of pinched rolls in the transverse direction of the expanded metal strip, opposite end portions of the tension roll being vertically movable independently of each other, so that the tension roll can be brought into a tilted state.

6. A process for continuously producing catalyst plates as set forth in claim 5, wherein said correcting distortions in said expanded metal strip is carried out by using an expanded metal strip corrector wherein the pinch rolls comprise upper and lower pinch rolls, the opposite end portions of the upper pinch rolls being vertically movable independently of each other so that the rolling pressure at opposite end portions of the pinch rolls can be varied.

7. A process of continuously producing catalyst plates as set forth in claim 5, wherein at least one additional pair of pinch rolls is provided between the pairs of inlet and the pairs of outlet pinch rolls, with the diameters of the pinch rolls gradually increasing from the inlet to the outlet so that the circumferential speed of the pinch rolls increases towards the outlet side.

8. A process of continuously producing catalyst plates as set forth in claim 1, wherein said second mentioned forming step includes a stepping press forming step in which the strip is fed step-by-step while being press-formed at each step by use of upper and lower press dies to form annular ridges in the strip, and in which said forming step the feeding direction of the strip and the linear directions of angular ridges of the plate material are aligned with one another.

9. A process of continuously producing catalyst plates as set forth in claim 8, wherein said second mentioned forming step is successively performed in step-by-step increments beginning with the ridges in the central portion and ending with the ridges in the side portions of the strip material.

10. A process of continuously producing catalyst plates as set forth in claim 8, wherein said upper and lower press dies are progressively varied in configuration step-by-step from the strip inlet portion to the strip output portion.

11. A process of continuously producing catalyst plates as set forth in claim 10, wherein the length of the each configuration of the press dies in the step-by-step process is greater than the length of each step-by-step feeding increment.

12. A process of continuously producing catalyst plates as set forth in claim 1 or 5, wherein said catalytic substance is one used for the denitration of exhaust gas.

13. A process of continuously producing catalyst plates according to claim 1, wherein the upper sheet is paper and the lower sheet is plastic.

14. A process of continuously producing catalyst plates according to claim 1, wherein the sheets are supplied by sheet feeder and are removed by sheet winders.

* * * * *